CHANGEABLE EXHIBITORS

Original Filed Jan. 12, 1948 7 Sheets-Sheet 1

INVENTOR
Eugene E. Reynolds
BY Taylor and Sangree
ATTORNEYS

CHANGEABLE EXHIBITORS

Original Filed Jan. 12, 1948 7 Sheets-Sheet 2

INVENTOR
Eugene E. Reynolds
BY Reyher and Lerner
ATTORNEYS

INVENTOR
Eugene E. Reynolds
BY Naylor and Sprague
ATTORNEYS

CHANGEABLE EXHIBITORS

Original Filed Jan. 12, 1948 7 Sheets-Sheet 4

INVENTOR
Eugene E. Reynolds
BY Naylor and Lanagan
ATTORNEYS

CHANGEABLE EXHIBITORS

Original Filed Jan. 12, 1948 7 Sheets-Sheet 5

INVENTOR
Eugene E. Reynolds
BY Neylan and Lange
ATTORNEYS

CHANGEABLE EXHIBITORS

Original Filed Jan. 12, 1948 7 Sheets-Sheet 6

INVENTOR
Eugene E. Reynolds
BY Neylan and Lanagan
ATTORNEYS

CHANGEABLE EXHIBITORS

Original Filed Jan. 12, 1948 7 Sheets-Sheet 7

INVENTOR
Eugene E. Reynolds
BY Naylor and Sawyer
ATTORNEYS

United States Patent Office

Re. 24,042
Reissued July 19, 1955

24,042

CHANGEABLE EXHIBITORS

Eugene E. Reynolds, Richmond, Calif., assignor to Marchant Calculators, Inc., a corporation of California Original No. 2,666,911, dated January 19, 1954, Serial No. 1,769, January 12, 1948. Application for reissue January 21, 1954, Serial No. 405,385

9 Claims. (Cl. 340—318)

Matter enclosed in heavy brackets [ ] appears in the original patent but forms no part of this reissue specification; matter printed in italics indicates the additions made by reissue.

This invention relates to changeable exhibitors, and more particularly to changeable exhibitors utilizing a stroboscopic effect to visually arrest data carried by a rotatable member in response to a data-selecting means, such as a keyboard.

The use of an intermittently flashing light to cause a revolving or reciprocating object to appear to stand still or move slowly is well known, and has been applied to several different uses, as, for example, for visually determining the correct pitch of a given sound; to produce visual patterns of a kaleidoscopic nature; and to ascertain the speed of rotating shafts. So far as I am aware, however, no previous attempt has been made in the art to cause a light to flash when a drum or disc reaches a selected one of a plurality of positions, nor has there been an attempt to relate a series of mechanical or electrical representations to pre-selected positions of the drum so that a light selectively controlled by any one of the mechanical or electrical representations will give a visual translation, or the correct meaning, of said representation.

It is an object of the present invention to provide a changeable exhibitor embodying a rotatable drum bearing a series of data, and means associated therewith, including a stroboscopic light, adapted to select a portion of said data and to visually arrest the movement of the same through the periodic flashing of said light.

Another object of the invention is to provide a changeable exhibitor comprising a rotatable drum carrying a series of data and means for selecting a portion of said data and operable to cause a periodic flashing of the stroboscopic light in timed relation to the position of said selected portion of data to render the latter viewable.

A further object of the invention is to provide a changeable exhibitor comprising a rotatable drum having a series of data, a series of mechanical or electrical representations associated with the drum, each representation corresponding to one of the series of data, and means to select one of the representations to cause a stroboscopic light controlled thereby to provide a visual translation in the form of one of the series of data of the selected mechanical or electrical representations.

Broadly, the embodiments of the invention, of which there are two fully shown and described, comprise a rotatable drum, a keyboard and a light source. The drum is provided with an indicating portion having a series of data in spaced relation on the periphery thereof, and a sensing portion having a pattern of electrical contacts associated with contact fingers which are in turn connected by leads to the keyboard. The depressing of an appropriate combination of keys of the keyboard denoting a particular series of data on the drum causes a bridging of selected contacts to energize the light source to illuminate said particular series of data each time this data is in registry with a viewing aperture of the exhibitor. The flashing of the light source each time the desired data coincides with the viewing aperture serves to visually arrest this data, and this condition obtains until another combination of keys is depressed.

Other objects and advantages of the invention will be apparent from the following description taken in conjunction with the drawings forming part of this specification, and in which.

Figure 2:
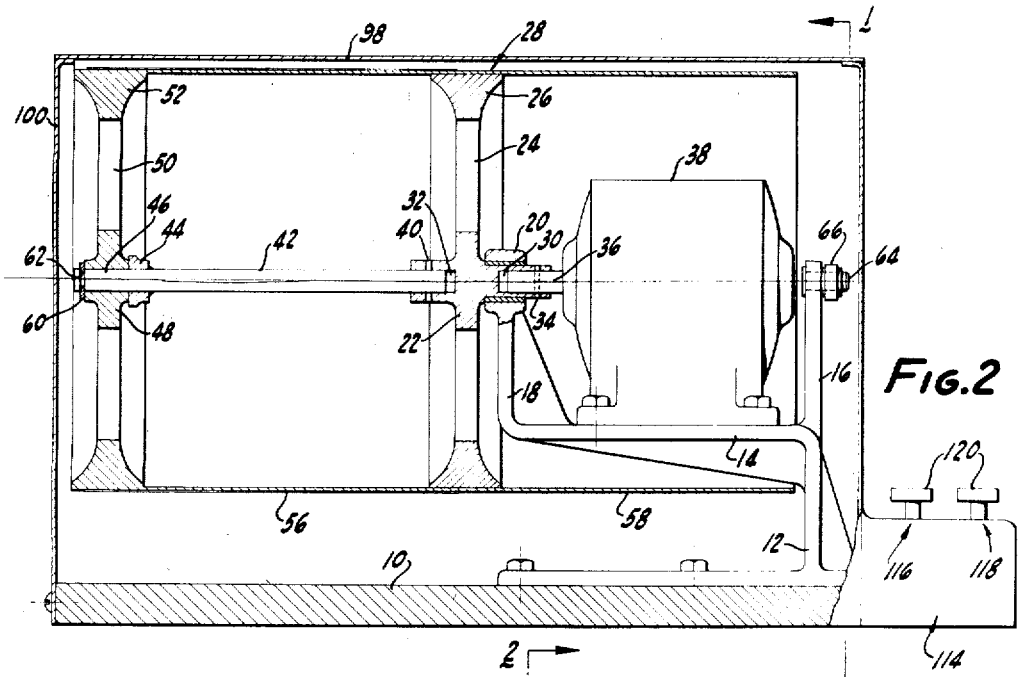
Figure 2 is a view of the device taken along the longitudinal section plane 2—2 of Figure 1, indicating by lines 1—1 the reference plane along which the view of Figure 1 was taken.
Figure 1:
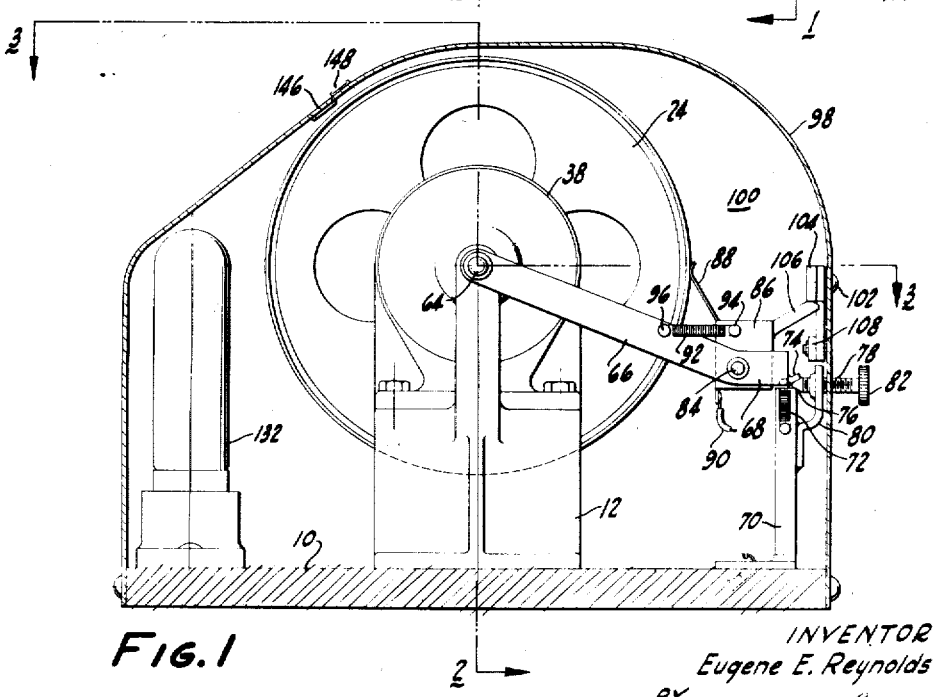
Figure 1 is a view in end elevation of one embodiment of the changeable exhibitor of the invention, said view being taken with the end of the casing removed.
Figure 3:
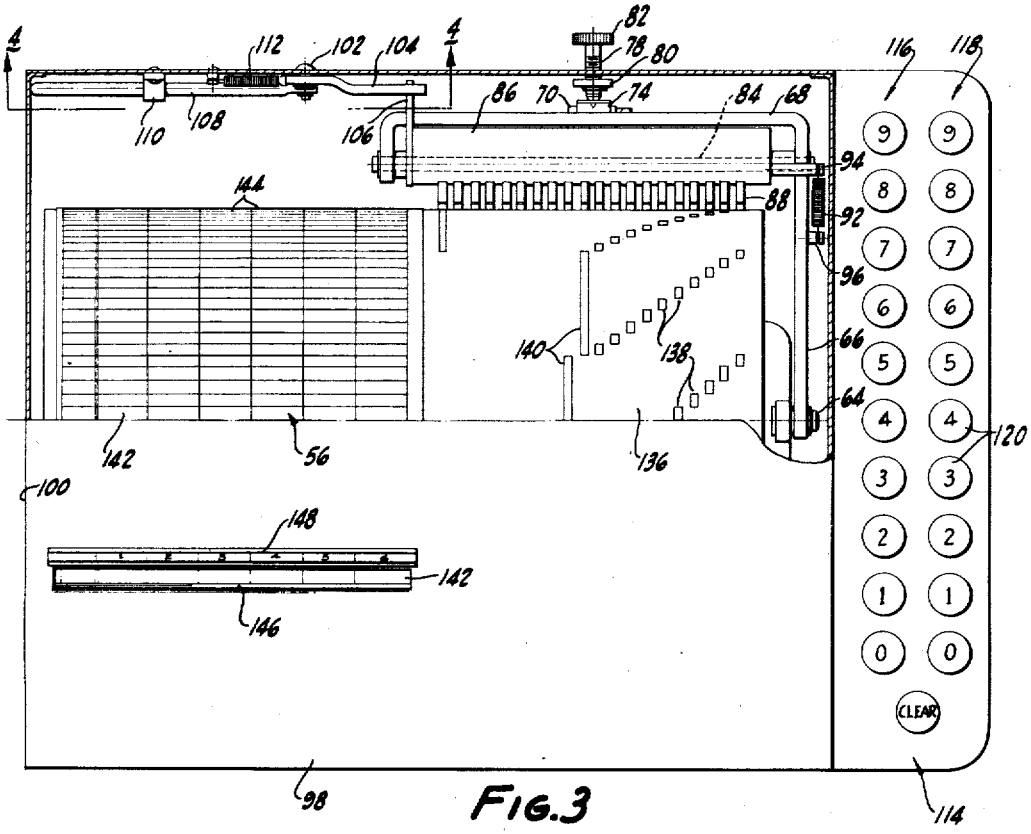
Figure 3 is a view of the exhibitor of Figures 1 and 2, taken along lines 3—3 of Figure 1.

Referring to the drawings for more specific details of the invention, and more particularly to Figures 1–6 showing the first embodiment of the invention, the changeable exhibitor is comprised of a base plate 10 having secured thereto to a support bracket 12 provided with a platform 14 and upstanding arms 16 and 18. The arm 18 terminates in a bearing sleeve 20 having journalled for rotation therein a hub 22 forming an integral part of a disc 24 having a flanged rim 26 supporting a drum 28. The hub 22 is counterbored to provide bores 30 and 32. bore [30] *32* being cylindrical in cross section and [has] *having* secured therein, as by a pin 40, a shaft 42 having a collar 44 fixedly secured thereto and an end 46 square in cross section. Sleeved on the square end 46 of shaft 42 into abutting relation with the collar 44 is a hub 48 forming an integral part of a disc 50 having a flanged rim 52 fixedly secured to the inner surface of the drum 28 having an indicating section 56 and a sensing section 58. The disc 50 is removably secured on the shaft 42 by a lock washer 60 carried in a groove 62 in said shaft.

The arm 16 of the bracket 12 carries a stub shaft 64 having pivotably secured thereto an arm 66 of a mounting bracket 68 normally supported by the upper end of a pedestal 70 secured to the base plate 10. A spring 72 having its ends secured to the pedestal 70 and the bracket 68 yieldingly urges the latter toward the former to bring a cam-type protuberance 74 on the bracket into engagement with the wedge-shaped end 76 of an adjustment screw 78 in threaded engagement with a bracket support 80 carried by the pedestal 70. Inward movement of the screw 78 by rotation of the knurled handle 82 in the proper direction forces the cam projection 74 upwardly to move the mounting bracket 68 to a limited degree in a counterclockwise motion, as viewed in Figure 1, while an outward movement of the screw 78 allows the mounting bracket to rotate in the opposite direction to contact the pedestal 70, said two-way limited movement of the bracket 68 being for a purpose hereinafter described.

The mounting bracket 68 supports a shaft 84 having pivotally mounted thereon an elongated block 86 of suitable insulating material. A plurality of spaced electrically conducting fingers 88, twenty in number for the particular embodiment shown, are carried by the block 86, each finger being connected to a separate electrical lead 90. The block 86 is urged in a counterclockwise direction to normally bring the fingers 88 into contact with the sensing section 58 of the drum 28 by means of a spring 92 secured at one end to a stub arm 94 carried by the block 86 and at the other end to a stub arm 96 carried by the arm 66 of the mounting bracket 68.

The base plate 10 and the drum 28 are enclosed by a casing 98 having a removable end wall 100. Secured to the rear wall of the casing by a pin 102 is a pivotable crank arm 104 having one end in engagement with an arm 106 carried by the block 86 and having pivotally secured to the other end thereof a rod 108 which passes through a guide bracket 110 secured to the casing 98 and engages the removable end wall 100. A spring 112 having one end secured to the crank arm 104 and the other end secured to the casing 98 serves to maintain the rod 108 in pressing engagement with the end wall 100. Upon the removal of said end wall from the casing so as to remove the drum 28 and replace it with another, rod 108 is moved to the left, as viewed in Figures 3 and 4, under the action of spring 112 and this spring rocks the crank arm 104 in a clockwise direction, as viewed in Figure 4, or a downward direction, as viewed in Figures 1 and 3, to force the arm 106 downwardly, thus rocking the block 86 against the inadequate counteraction of spring 92 to bring the fingers 88 out of engagement with the drum 28 for the removal of the latter without damage to the fingers.

A keyboard 114 located on the base plate 10 adjacent the casing 98 is provided with two rows 116 and 118 of keys 120, each row having the ten keys numbered from "0" to "9." The keys are of the conventional flexible type whereby the depressing of any key will latch said key in the depressed position, while the depressing of another key in the same row will release the previously latched key. Each of the keys 120 comprises a depressable electrical contact 122 and a fixed electrical contact 124 therebeneath, as shown schematically in Figure 6, the fixed contacts 124 of rows 116 and 118 being connected in series with leads 126 and 128, respectively, of a conventional strobotron circuit, indicated generally at 130 and including a strobotron tube 132, also shown in Figure 1 as being secured to the base plate 10 within the casing 98, and the movable contacts 122 of rows 116 and 118 being connected by separate leads 134 to the fingers 88. The key contacts 122 of row 116, representing the "tens" row of numbers, are connected to the left hand group of ten of the twenty fingers 88 as viewed in Figure 3 and shown in Figure 6, the contact of key "9" being connected to the finger 88 furthest to the left, and so on, while the key contacts of row 118, representing the "units" row of numbers, are connected to the right hand group of ten of the fingers 88, as also viewed in Figure 3 and shown in Figure 6, the contact of key "9" of this row being connected to the finger furthest to the left of this group, and so on.

Figure 5:
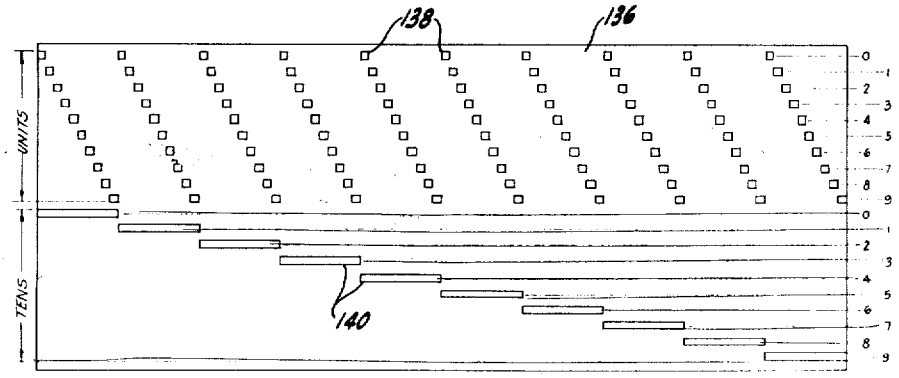
Figure 5 is a planar development of the sensing pattern carried by the sensing portion of the drum.

The sensing portion 58 of the drum 28 serves as an electrical conducting bridge between the two groups of fingers 88; that is, when the switch is closed and one of the keys of each of the rows 116 and 118 is depressed to bring the movable contacts 122 thereof into engagement with the fixed contacts 124, the fingers 88 connected to the two activated keys are connected into the strobotron circuit 130 by means of the leads 126, 128 and 134, and thus the two activated fingers 88 are bridged to cause energization of the strobotron 132 whenever said two fingers simultaneously contact the sensing portion 58 of the drum 28 through the sensing pattern 136 of Figure 5.

The sensing pattern 136 comprises a sheet or coating of suitable insulating material covering the electrically conducting sensing portion 58 of the drum 28, said pattern comprising ten rows of staggered spaced apertures 138, revealing the conducting drum therebeneath and in alignment with those of the fingers 88 connected to the row 118 of keys 120, and ten elongated apertures 140 in staggered relation with each other and in alignment with those of the fingers 88 connected to the row 116 of keys 120. Each of the "units" fingers 88 contacts the sensing portion 58 of the drum through the sensing pattern 136 ten times during each revolution of the drum; one of said "units" fingers is in contact with the drum at any given instant; and no more than one of the "units" fingers has such contact at any given instant. Each of the "tens" fingers 88 contacts the sensing portion 58 of the drum through the sensing pattern 136 once during each revolution of the drum; only one of the "tens" fingers makes such contact at any given instant; and the period of contact of each "tens" finger is ten times as long as the period of contact of each "units" finger[s], thus allowing for a contact with the drum of each "units" finger while only a single "tens" finger is making contact. It will thus be seen that when any number from 0 to 99 is set up on the keyboard 114 by depressing the corresponding keys 120 in the "units" row 118 and "tens" row 116 there will be an electrical bridging of the "units" and "tens" fingers 88 connected to the depressed keys at a predetermined position of the drum 28 through the elongated aperture 140 corresponding to the depressed "tens" key and through the particular aperture 138, both corresponding to the depressed "units" key and subtended by the particular aperture 140, and this bridging will cause a closing of the strobotron circuit 130 to energize the strobotron 132 once during each revolution of the drum regardless of the speed of rotation of the drum.

It has thus far been seen that the depressing of the keys 120 denoting a particular number within the range 0 to 99 causes a single flashing of the strobotron 132 at a predetermined position of the drum 28 during each rotation of the drum under the action of motor 38, said motor being energized by the switch—which also serves to energize the strobotron circuit 130. It will now be understood that the indicating portion 56 of the drum 28 comprises a sheet of paper, or the like, cylindrically wrapped on the drum and removably secured thereto, and that this sheet may be divided into as many as 99 peripheral data lines or spaces 142 divided, if desired, into columns 144, each line corresponding to a numerical notation represented by a particular combination of the keys 120, and each line being so correlated with the sensing pattern 136 that it will be in registry with a casing aperture or viewing space 146 provided with an indicia strip 148 thereabove, when the strobotron flash occurs for the selected key combination and illuminates the particular spaces 142 of the indicating section.

The periodic flashes of the strobotron corresponding to any chosen key combination should preferably be of such frequency that the time between succeeding flashes will be less than the image retention time for the human eye so that the desired information on a particular line 142 of the indicating section of the drum, corresponding to the depressed keys, will be constantly viewable by the operator without perceptible flicker. The speed of rotation of the drum is otherwise unimportant, since the flash of the strobotron and the registry of the desired information with the viewing space 146 depend on the position of the drum and not on the speed thereof.

As an example of the type of information chart or table which may be utilized with this embodiment of the invention, each line 142 of the indicating portion 56 of the drum may contain payroll tax information showing the tax deduction to be made from a check of a certain amount, the amount of the check being denoted in dollars by the keys 120. The depressing of the appropriate keys will instantly make the desired tax information viewable through the space 146, and this information will remain viewable until a new combination of keys is depressed. Various other types of information tables may, of course, be used with the device, and it is also to be pointed out that the number of lines 142 of the indicating drum may be increased along with the provision of added fingers 88 and added rows of keys.

In the event that the information presented to the operator's view is not centered within the space 146, but is located either high or low within the space so as to be partly obscured, the operator may turn the adjustment screw 78 in the appropriate direction to either raise or lower the mounting bracket 68 and block 86 to correspondingly raise or lower the fingers 88, thus achieving the strobotron flash a little later or a little earlier in the rotation cycle of the drum to bring the illuminated line of information squarely within the viewing space 146.

While the above-described embodiment of the invention is adapted for use with indicating charts containing pre-calculated data, said charts being removable as a unit and not requiring any change of data thereon when in position on the drum, the hereinafter described modification of the exhibitor, as shown in Figures 7–13, is particularly adapted for use with data-bearing strips, which, due to the particular information carried thereby, may become outmoded, thus requiring substitution of new data strips for the outmoded ones. Accordingly, the sensing drum portion of the device is so arranged that the contacts carried thereby may be separately changed to maintain these contacts in correlation with changes made on the indicating drum.

The changeable exhibitor of Figures 7–13 is comprised of a base plate 210, a casing 212 provided with a viewing space 214 and an indicia strip 216 thereabove, and a keyboard 218 having, for example, five rows 220, 222, 224, 226 and 228 of keys 230, each row having ten keys, numbered from "0" to "9," and each key being of the conventional flexible type, whereby the depressing of any key in any one row latches said key in the depressed position, and whereby the depressing of a second key in the same row latches the latter and releases the previously depressed key.

Mounted on the base plate 210 within the casing 212 are opposed brackets 232 serving as bearing supports for a shaft 234 being secured thereto by a pin 236 and a drum 238 having a large diametral or indicating section 240 and a small diametral or sensing section 242.

The indicating section 240 of the drum is in alignment with the viewing aperture 214 and is provided with a plurality of peripheral slots 244 adapted to have inserted therein, as through a casing door 246 containing the viewing aperture 214, indicia strips 248 containing, for example, parts-list information, including a part number 250, a part name 252, and a cost figure 254. The sensing section 242 of the drum has mounted thereon a plurality of interfitting elements, both of electrically conducting material and insulating material, forming the sensing pattern indicated generally at 256 in Figure 9.

The sensing pattern structure is comprised of a ring 258 sleeved over the drum section 242 in abutting relation with the indicating section 240 of the drum, said ring having a plurality of spaced radial slots 260 in one face thereof spaced apart a distance equal to the spacing between the indicating strips 248 and in alignment therewith. The slots 260 are provided with lips 262 at the upper end thereof. Other rings 264 having slots 260 and lips 262 are arranged in abutting relation to form five banks of rings 266, 268, 270, 272 and 274, said rings being provided with slots 276 in their faces oppositely disposed to the slots 260. Contact rings 278 having spaced teeth 280 extending into the slots 276 are carried between the rings 264, while elongated contact members 282, best viewed in Figure 12, having upwardly extending fingers 284, arms 286 and drum surface contacts 288, are extended through each of the spaced sets of aligned apertures 290 of the rings 264 of a bank and are moved upwardly so that the fingers 284 extend into the slots 276 by the subsequent insertion into the apertures 290 of locking blocks 292. The elongated contact members and locking blocks 292 secure the rings 264 of each bank 266, 268, 270, 272 and 274 together as a unit. Banks 266 and 268 have the arms 286 of their elongated contact members directed toward each and spaced apart by a spacer ring 294 having niches 296 for the reception of the surface contacts 288; banks 270 and 272 have their contact members 282 similarly orientated and another ring 294 is provided therebetween; and banks 268 and 270 and 272 and 274 are separated by other rings 258. All of the rings 258, 264 and 294 are provided with aligned keyways 298 to receive an elongated key 300 carried by the drum section 242, thus locking the sensing pattern structure to the drum for rotation therewith. The sensing pattern structure is secured against endwise displacement from the drum by plate 302 affixed to the end of drum section 242, as by bolts 304.

The rings 278 and the contact members 282 are electrical conducting elements, while the rings 258, 264 and 294 and the locking blocks 292 are of insulating material. The rings 278 have in contact therewith electrical conducting fingers 306 carried by an insulation block 308 supported within the casing 212 by a bracket 310 secured to the base plate 210, said fingers being connected by leads 312 to the keys 230 so that the keys of row 220 are sequentially connected to the rings 278 of bank 266 of the sensing pattern, the keys of row 222 to bank 268, row 224 to bank 270, row 226 to bank 272, and row 228 to bank 274. Other contacting fingers 314, 316 and 318 serve as stationary bridging contacts for the drum surface contacts 288. The free ends of fingers 314, 316 and 318 are in alignment, and, preferably, also in alignment with the viewing aperture 214, while the fingers have their other ends secured to an insulation block 320 pivotally mounted on a U-shaped mounting bracket 322 having its ends supported on shaft 234 and having an intermediate support comprising a cam 324 carried by the bracket 322 in engagement with the end of an adjustment screw 326, which, in turn, is threadably engaged with bracket 328 carried by a pedestal 330 secured to the base plate 210. A spring 332 interconnecting the block 320 and bracket 322 serves to urge the fingers 314, 316 and 318 into contact with the drum, while another spring 334 interconnecting the bracket 328 and the pedestal 330 serves to maintain the cam 324 in pressing engagement with the screw 326. The adjustment screw 326 projects out of the casing and is provided with a knurled handle 336.

Figure 6:
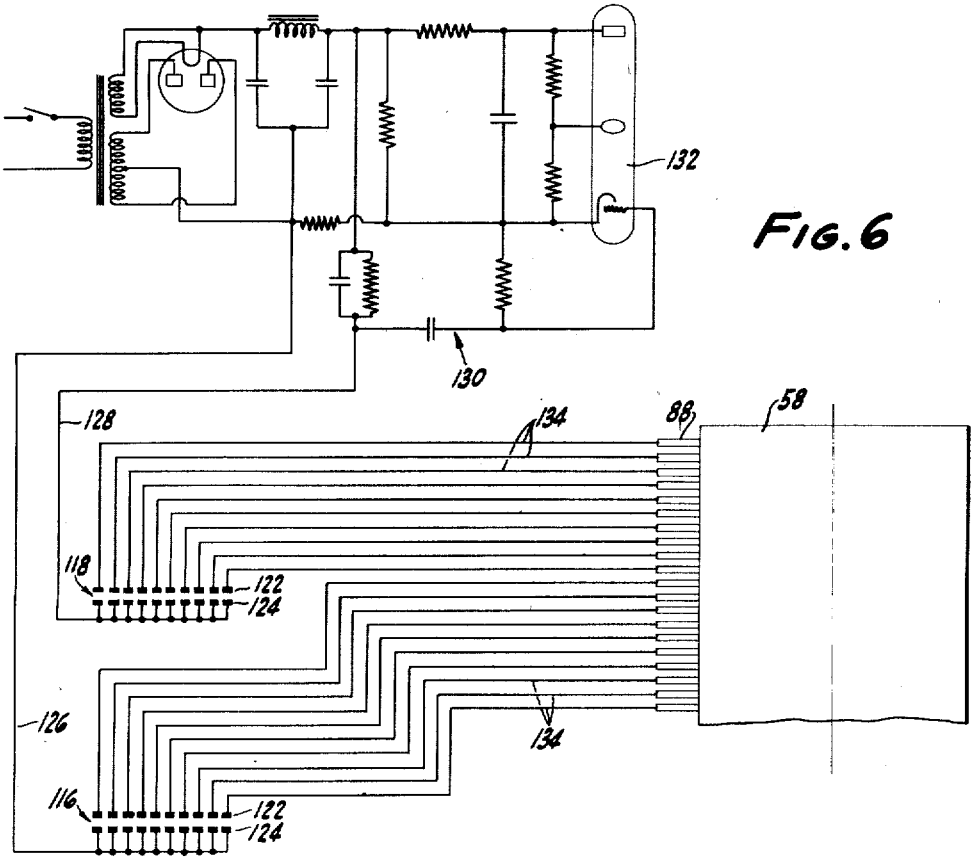
Figure 6 is a schematic diagram showing the circuit arrangement interconnecting the keyboard, the sensing portion of the drum, and the strobotron.
Figure 4:
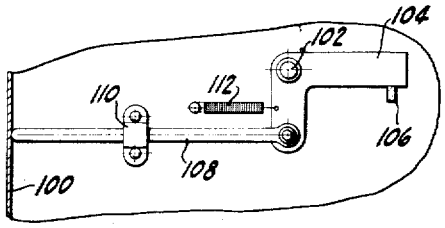
Figure 4 is a detail view taken along lines 4—4 of Figure 3.
Figure 7:
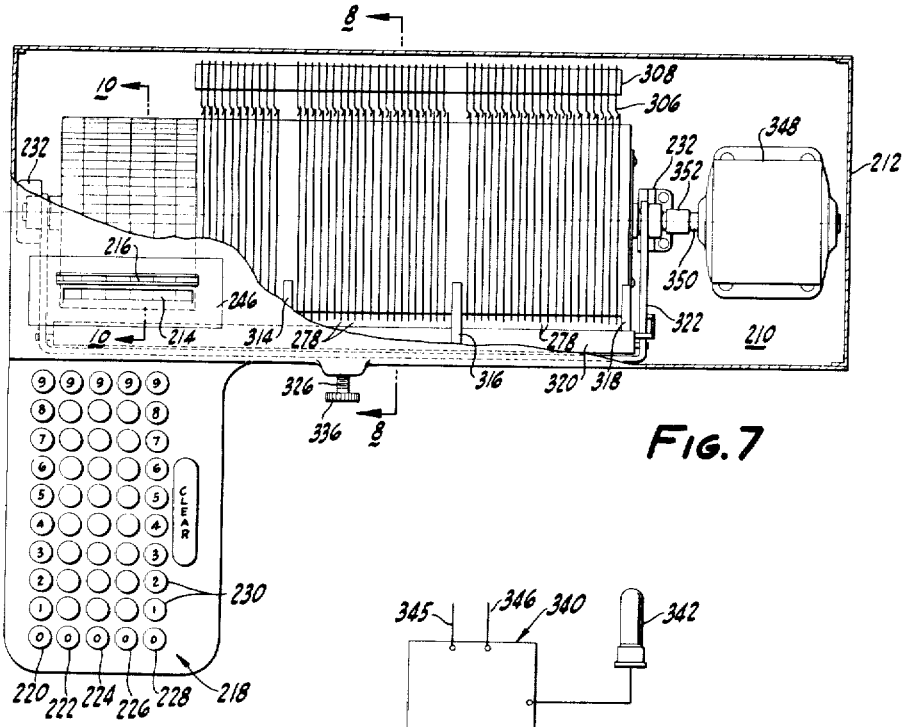
Figure 7 is a plan view of a modification of the changeable exhibitor of the invention with the casing thereof partly broken away.

The finger 318, in wiping engagement with the drum contacts 288 of bank 274, is connected by lead 338 to a strobotron circuit, indicated generally at 340 and similar to strobotron circuit 130 of Figure 6, including a strobotron 342, said strobotron being secured to the base plate 210 within the casing adjacent the indicating section 240 of the drum, while the circuit 340 is connected by lead 344 to the row of keys 220. The circuit 340 is provided with power leads 345 and 346 adapted to supply current to said circuit upon the throwing of a switch, not shown, which switch may be made effective at the same time to energize a motor 348, mounted within the casing 212 on the base plate 210, to cause the motor shaft 350 to drive shaft 234 and drum 238 through a coupling 352, thus causing the indicia strips 248 to move rapidly past the viewing aperture 214.

Figure 9:
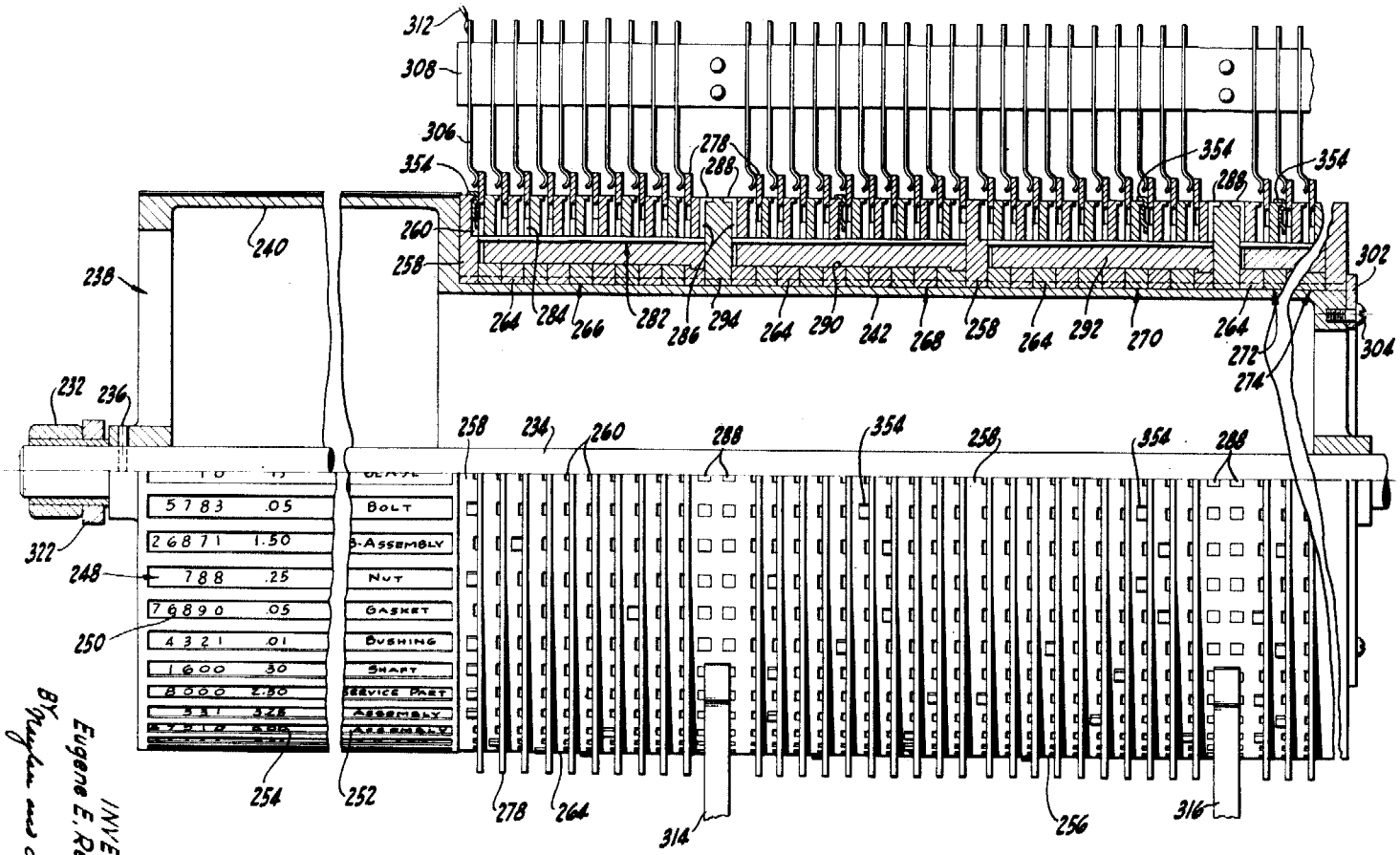
Figure 9 is a view taken along lines 9—9 of Figure 8.
Figure 11D:
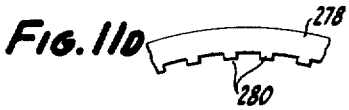
Figures 11D and 11E are views in side elevation of two of the sensing drum elements of Figure 11.
Figure 11A:
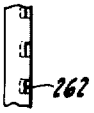
Figures 11A, 11B and 11C are plan views of the sensing drum elements in Figure 11 therebeneath.
Figure 11B:
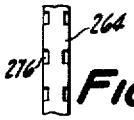
Figure 11C:
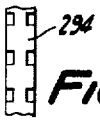
Figure 11:
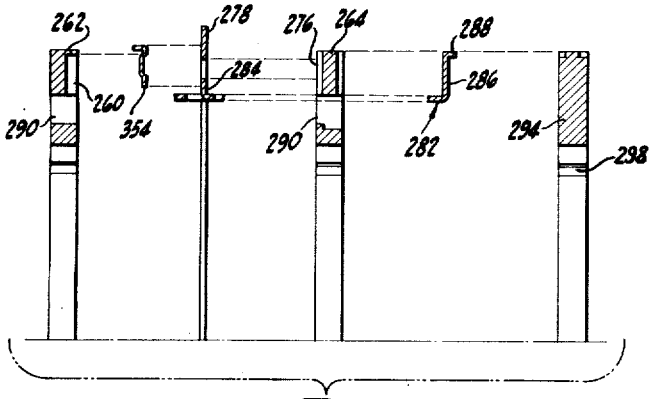
Figure 11 is an exploded view in section of the structural elements of the sensing drum, showing the cooperative relationship thereof.
Figure 11E:
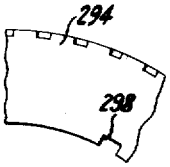
Figure 12:
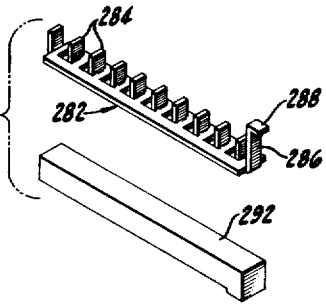
Figure 12 is an exploded view in perspective of the locking elements adapted to secure a plurality of sets of the elements of Figure 11 together, as shown in Figure 9.

It will be noted that each strip 248 has in alignment therewith a row of fifty slots 260, there being five banks of ten slots each in this row. Spring contacting clips 354, shown best in Figures 9 and 11, are pressed into one slot 260 in each of the five banks of slots in the aforesaid row to form an electrical bridge between the particular rings 278 carried adjacent said slots and the particular fingers 284 of the connector 282 therebeneath. For example, if the strip 248 has the part number 4710 thereon, a clip 354 is placed the first or "zero" slot of bank 266, corresponding to the "zero" key of key row 220; and clips are placed in the "four" slot of bank 268, the "seven" slot of bank 270, the "one" slot of bank 272, and the "zero" slot of bank 274. In like manner the slots corresponding to the part numbers carried by each of the strips 248 are provided with clips 354.

Figure 13:
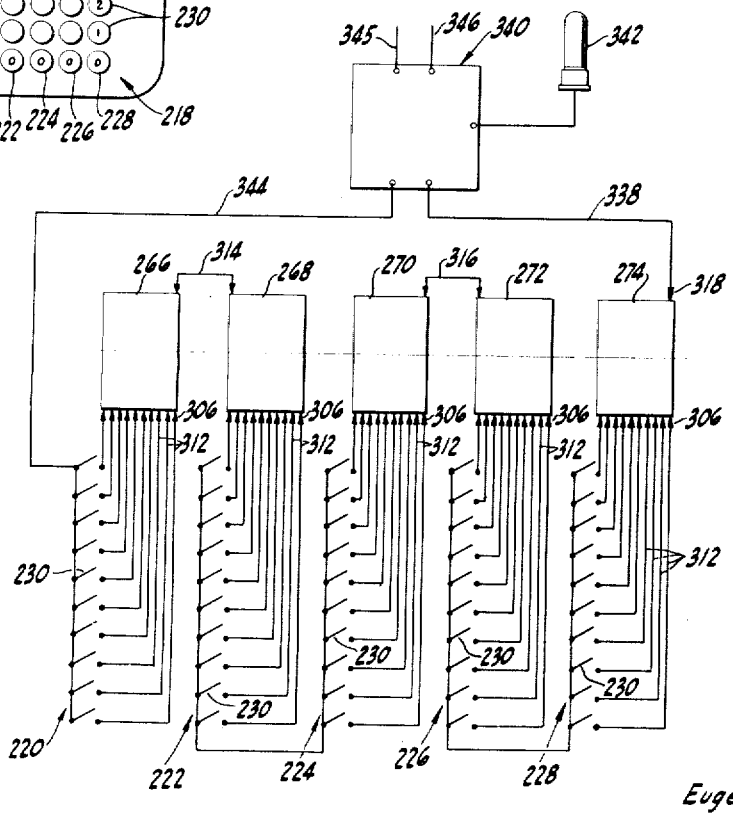
Figure 13 is a schematic diagram showing the circuit arrangement interconnecting the keyboard, the sensing drum and the strobotron.
Figure 8:
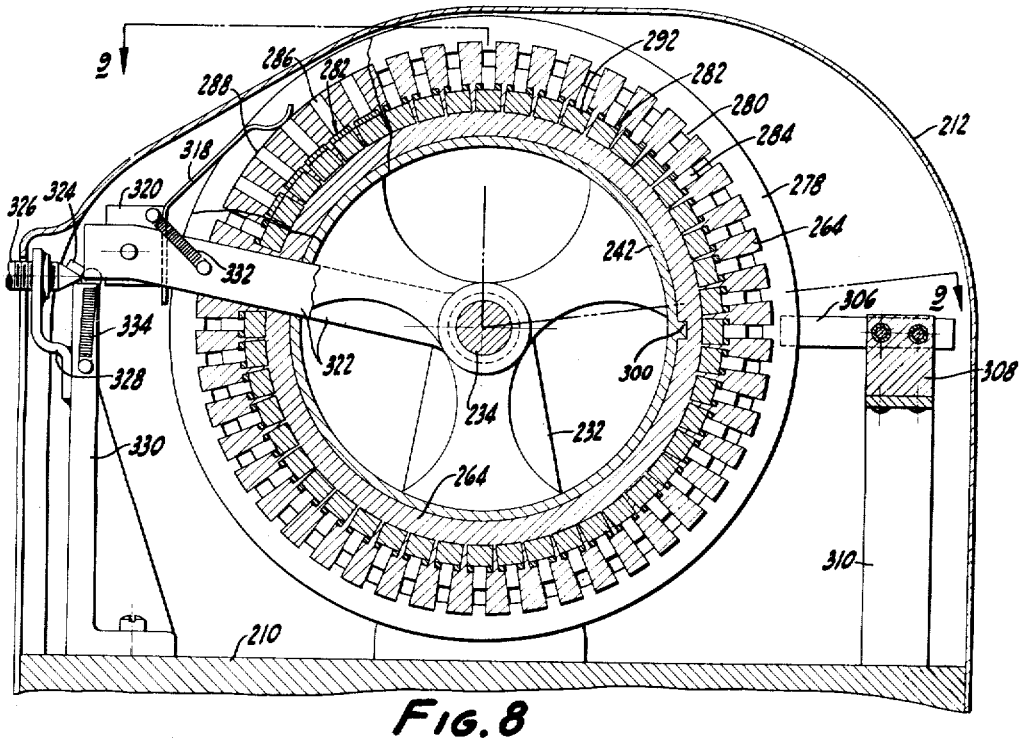
Figure 8 is an enlarged view in section of the exhibitor taken along lines 8—8 of Figure 7.
Figure 10:
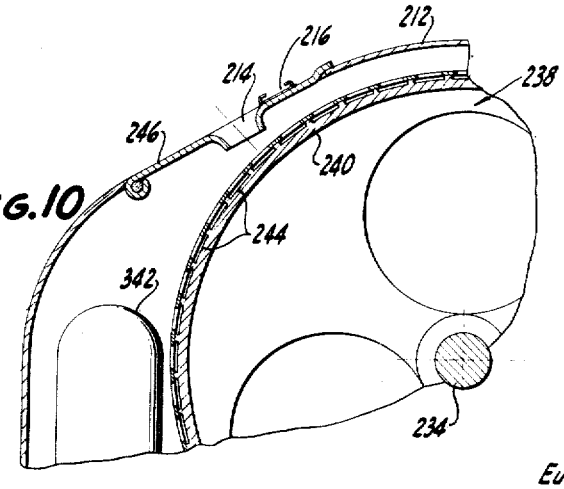
Figure 10 is an enlarged partial view taken along lines 10—10 of Figure 7.

Assuming that the motor 348 is in operation and the drum 238 is being rotated thereby, the operator may find the classification 252 and the price 254 of any part in the following manner. If the part number is 4710, for example, the "zero" key of row 220 is depressed to latch, and the "four," "seven," "one," and "zero" keys of key rows 222, 224, 226 and 228, respectively, are likewise depressed. At the precise instant that the strip 248, bearing information relative to part number 4710 is within the viewing aperture 214, the drum contacts 288 in alignment with said strip are contacted by fingers 314, 316 and 318, and current flows through the strobotron circuit 340 and the five banks of the sensing drum to cause the strobotron 342 to flash. The current takes the following path, as shown in Figure 13: lead 345, circuit 340, lead 344, "zero" key of row 220, lead 312 to finger 306, "zero" ring 278 of bank 266, clip 354, connector 282, drum contact 288, finger 314, drum contact 288 of bank 268, clip 354, ring 278, finger 306, lead 312, "four" key of row 222, "seven" key of row 224 connected in series therewith, and, in like manner, through bank 270, finger 316, bank 272, "one" key of row 226, "zero" key of row 228 in series therewith, bank 274, finger 318, lead 338, circuit 340, and lead 346 to flash the strobotron 342.

As the strip 248 for part number 4710 passes the viewing aperture 214, the fingers 314, 316 and 318 are no longer in contact with the drum contacts 288 in alignment with said strip, thus causing a break of the circuit through the five banks of the sensing portion of the drum. However, as long as the same keys remain depressed, the strobotron will flash each time the part number 4710 strip reaches the aperture 214, thus "freezing" this strip for view by the operator. The depressing of any other five keys 230, one in each of the five key rows, will visually arrest the part number strip, corresponding to the key combination, within the viewing aperture.

If any strip 248 contains obsolete information, it may be removed through the casing door 246 and replaced by a new part number strip, and any suitable door arrangement may be provided in the casing 212 so that access may be had to the sensing section of the drum for the purpose of removing the clips 354 corresponding to the removed strip and inserting other clips 354 in the proper slot 260 corresponding to the part number of the new strip. To facilitate placement of the clips 354 in the proper slots, numbers or other appropriate indicia sequentially identifying the rows of slots 260 may be printed on the casing 212 in alignment with said rows.

In the event that the strips 248 are not visually arrested fully within the viewing aperture, the fingers 314, 316 and 318 may be slightly raised or lowered to either delay or advance the making of the circuit so that the strips 248 will be in the center of aperture 214 at that time. This raising or lowering of the fingers 314, 316 and 318 is accomplished by the proper rotation of adjusting screw 326 to raise or lower the mounting bracket 322, thus causing a corresponding movement of the block 320 carrying said fingers.

It will be obvious that other types of information may be furnished on the strips 248, and that the number of strips carried by the indicating portion of the drum may be varied, and, further, that the number of key rows and sensing banks may be varied as desired. In general, it is intended that the embodiments of the invention may be modified within the spirit of the invention and the scope of the appended claims.

What I claim as new and desire to secure by Letters Patent is:

[1. A device of the class described comprising a rotatable member having an indicating portion carrying data in spaced units and a sensing portion provided with a pattern of electrical contacts, a combination of said contacts associated with each unit of data, a stroboscopic light source, and means connected to said pattern and operable to select a combination of said contacts to intermittently energize said light source during rotation of said member when the unit of data associated with said combination is in a predetermined position.]

[2. A device of the class described comprising a cyclically movable member carrying linear units of data, an ordinal combination of electrical contacts associated with each of said units of data, a stroboscopic light source, and means selectively operable during movement of said member to interconnect said light source and a combination of contacts to control the energization of said source when the unit of data associated with said selected contacts reaches a predetermined position.]

[3. A device of the class described comprising a rotatable member, lines of spaced data carried thereon, said lines of data being adapted to be moved sequentially and recurrently past a viewing locus, an electrical circuit, a light source in said circuit, and switch means in said circuit for stroboscopically arresting at said viewing locus a desired line of data through cyclic energization of said light source in timed relation to the cyclic positioning of said desired line of data at said viewing locus comprising a second member movable in timed relation with said rotatable member, a plurality of aligned sensing fingers in wiping engagement therewith, a plurality of spaced combinations of electrical contacts carried by said second member, each combination being positionally related to a line of spaced data on said rotatable member and being adapted to sequentially engage said sensing fingers, and selector means adapted to selectively connect a combination of sensing fingers into said circuit in matching relation with the combination of contacts positionally related to said desired line of data to thereby close said circuit and energize said light source when said related combination of contacts is engaged by said selected combination of sensing fingers.]

[4. A device of the class described as set forth in claim 3 embodying means associated with said sensing fingers as a group to adjust the line of wiping contact of said fingers with said second member to thereby enable the positional adjustment of a stroboscopically disclosed line of data at said viewing locus.]

[5. In a device of the class described, a cylindrical drum-like member having a data portion at one end and a sensing pattern portion at the other end, said data portion of the member carrying a plurality of spaced rows of data arranged peripherally of said portion in parallel relation to the longitudinal axis of said member, and said sensing pattern portion being provided with a plurality of spaced rows of electrical contacts arranged peripherally of said portion in parallel relation to the longitudinal axis of said member, with each row having at least two laterally spaced contacts interconnected by an electrical conductor, said laterally spaced contacts in each row being positionally related on said member to a specific row of data on said data portion thereof and comprising code locator means for said specific row of data.]

[6. In a device of the class described, the member set forth in claim 5 wherein said data portion of said member is provided with data row carrier means enabling the removal of any given row of data for replacement by another row, and wherein said sensing pattern portion embodies means for the variable positioning of electrical contacts in each of the spaced rows of contacts to adapt a contact row as code locator means for its positionally related data row when a data replacement is made in said row.]

[7. A device of the class described comprising a cylindrical drum-like member having a data portion at one end and a sensing portion at the other end, said data portion of the member carrying a plurality of spaced rows of data arranged peripherally of said portion in parallel relation to the longitudinal axis of said member, and said sensing pattern portion being provided with a plurality of spaced rows of electrical contacts arranged peripherally of said portion in parallel relation to the longitudinal axis of said member, with each row having at least two laterally spaced contacts interconnected by an electrical conductor, said laterally spaced contacts in each row being positionally related on said member to a specific row of data on said data portion thereof and comprising code locator means for said specific row of data, means for rotating said member, and means for visually disclosing a selected row of data while said member is rotating comprising electrical circuit means including a strobotron adapted upon the intermittent closing of said circuit to disclose at a viewing locus said selected row of data, sensing fingers in wiping relation to the contacts of said sensing pattern, and keyboard selector means adapted to selectively connect a combination of said sensing fingers into said circuit in matching relation to the combination of contacts representative of the row of data selected for visual disclosure, said circuit being intermittently closed by recurrent engagement of said combination of contacts and said combination of sensing fingers.]

8. A device of the class described comprising a cylindrical drum-like member having a data portion at one end and a sensing portion at the other end, said data portion of the member carrying a plurality of spaced and removable and replaceable rows of data arranged peripherally of said portion in parallel relation to the longitudinal axis of said member, and said sensing portion comprising at least two banks of conductor elements, each bank having a plurality of spaced ring conductors circumferentially arranged on said member, a plurality of spaced longitudinal conductors in parallel relation to the axis of said member, and means for selectively connecting each longitudinal conductor of a bank with one of said ring conductors, the longitudinal conductors of one bank being in alignment with the respective longitudinal conductors of the other bank, with each row of aligned conductors being positionally related to a specific row of data, said selective connecting means being adapted to serve as code locator means for the particular data occupying said specific row, means for rotating said member, and means for visually disclosing a selected row of data while said member is rotating comprising electrical circuit means including a strobotron adapted upon the intermittent closing of said circuit to disclose at a viewing locus said selected row of data, a bank of sensing fingers in wiping engagement with the conductor rings of each bank, keyboard selector means adapted to selectively connect a sensing finger of each bank through its associated conductor ring to the longitudinal conductors with which said ring is connected by said selective connector means to thereby select a row of aligned longitudinal conductors positionally related to said selected row of data, and bridging means in mutual wiping relation to the aligned ends of said longitudinal conductors adapted to electrically interconnect the longitudinal conductors of said selected row and close said circuit when the corresponding row of data is at said viewing locus.

[9. In a device of the class described including a drum-like member, means mounting said member for rotation, units of data carried by said member, an electrical circuit having a strobotron adapted upon the closing of said circuit to visually arrest one of said units of data, and electrical selector means for said circuit adapted to variably control the closing of said circuit to arrest any given unit of data; the provision in said selector means of a sensing pattern on said drum-like member in laterally adjacent relation to said units of data, said pattern having circuit closing contacts for each of said units of data positionally related on said member to their associated data units, and means for removing said member, including the data units and sensing pattern carried thereby, as an integral unit from said mounting means to allow the substitution therefor of another drum-like member having data dissimilar to the data of the removed member and a sensing pattern of contacts positionally related to said new or dissimilar data.]

[10. In a device of the class described including a drum-like member, means mounting said member for rotation, units of data carried by said member, an electrical circuit having a strobotron adapted upon the closing of said circuit to visually arrest one of said units of data, and electrical selector means for said circuit adapted to variably control the closing of said circuit to arrest any given unit of data; the improvement in said selector means of a first circuit-switching means comprising a sensing pattern located in adjacent relation to said member and rotatable in timed relation therewith, said pattern having circuit-closing contacts for each of said units of data positionally related with respect to their associated data units, and second circuit-switching means comprising a keyboard so correlated with said sensing pattern that upon selective operation of any particular keys said circuit is conditioned for closure by the circuit-closing contacts of said pattern correlated with said selectively operated keys.]

[11. In combination, a movable member bearing intelligence in spaced units, a stroboscopic light source within illuminating distance of said member, a coded sensing pattern movable in coordination with said member, each unit of intelligence being represented by a different portion of said pattern and being positionally related to its associated pattern portion, and selector means responsive to the positioning of a portion of said pattern during movement of the pattern to intermittently energize said light source and illuminate and visually arrest the intelligence unit associated with said pattern portioned selectively positioned.]

*12. In a data locating system having, a movable member adapted to store changeable representations of data at predetermined positions thereon, means for selectively storing representations of the data at one or more of said positions, means for moving said member, and means for receiving representations of said positions; the combination of, means for entering into the receiving means a representation of a selected one of said positions, locating means operable in timed relation to the movement of said member for sequentially establishing representations of said positions, a series of regularly spaced indicia on said member, means for sequentially sensing said indicia, correlating means operable under the joint control of the location means, the receiving means, and the sensing means, in response to each sensing of said indicia by said sensing means, to test for a coincidence between the position representation established by said locating means and the position representation entered into said receiving means; and manifesting means coupled with*

*said correlating means and operable in response to coincidence detection which is sensed by the correlating means for producing a manifestation of the data stored at said selected position.*

*13. In a data locating system; the combination of: a moving member having, a data portion for storing changeable representations of data at predetermined positions thereon, and a locator portion for storing changeable locator representations corresponding to said positions; means for selectively changing at least one of said data representations; means for selectively changing at least one of said locator representations; means for sensing said locator representations; separate means for receiving a selected locator representation; separate means for entering into said receiving means a selected locator representation; correlating means operable under the joint control of the sensing means and the receiving means to detect a coincidence between a sensed locator representation and said selected locator representation; and means controlled jointly by the data portion of said member and said correlating means and operable in response to the detection of said coincidence by the correlating means to produce a manifestation of the representation of data stored on said member at the position corresponding to said selected locator representation.*

*14. In an information locating system, the combination of: a cyclically moving member having, an information section for storing changeable information at various positions thereon, and a locator section for storing changeable locator representations corresponding to said positions; means for selectively changing the information stored at one or more of said positions; means for selectively changing one or more of said locator representations; first sensing means for sequentially sensing said locator representations; separate means for receiving selected locator representations; separate means for entering into said receiving means a selected locator representation; a series of regularly spaced indicia; second sensing means for sensing said indicia seriatim, means correlating the locator section, the receiving means, and the first and second sensing means, and operable in response to each sensing of said indicia by said second sensing means to test for a coincidence between the locator representation sensed by the first sensing means and the locator representation entered into said receiving means; and means coupled with said correlating means and operable thereby, in response to the detection of said coincidence by the correlating means, to produce a manifestation of the information stored at the position corresponding to said selected locator representation.*

*15. In an information locating system, the combination of: a cyclically moving member having, an information section for storing changeable information at various positions thereon, and a locator section for storing changeable plural-order locator representations corresponding to said positions; means for selectively changing the information stored at one or more of said positions; means for selectively changing one or more of said plural-order locator representations; first sensing means for sequentially sensing said locator representations, and operable during each sequential sensing to simultaneously sense all orders of each locator representation; means for receiving selected plural-order locator representations; means for entering into said receiving means a selected plural-order locator representation; a series of regularly spaced indicia; second sensing means for sensing said indicia seriatim; means correlating the locator section, the receiving means, and the first and second sensing means and operable, in response to each sensing of said indicia by said second sensing means, to test for a simultaneous coincidence, in all orders, between the locator representation sensed by the first sensing means and the locator representation entered into said receiving means; and means coupled with said correlating means and operable thereby, in response to the detection of said coincidence by said correlating means, to produce a manifestation of the information stored at the position corresponding to said selected locator representation.*

*16. In a data locating system, the combination of: a cyclically moving member having, a data section for storing changeable representations of data at various positions thereon, each of said data positions corresponding to a plural-order locator representation, and a locator section for storing changeable plural-order locator representations; each locator representation having only one mark in each order, means for selectively changing the representations of data at one or more of said positions; means for selectively changing one or more of said locator representations; means for successively sensing said plural-order locator representations; means for receiving plural-order locator representations; means for entering into the receiving means a selected plural-order locator representation; correlating means operable under joint control of the sensing means and said receiving means for detecting a simultaneous coincidence, in all orders, between a sensed plural-order locator representation and the plural-order locator representation entered into the receiving means; and means controlled by said correlating means and operable in response to the detection of said coincidence by the correlating means to produce a manifestation of the data representation stored at the position corresponding to said selected plural-order locator representation.*

*17. A device of the class described comprising a rotatable member, lines of spaced data carried thereon, said lines of data being adapted to be moved sequentially and recurrently past a viewing locus, an electrical circuit, a light source in said circuit, and switch means in said circuit for stroboscopically arresting at said viewing locus a desired line of data through cyclic energization of said light source in timed relation to the cyclic positioning of said desired line of data at said viewing locus comprising a second member movable in timed relation with said rotatable member, a plurality of aligned sensing fingers in wiping engagement therewith, a plurality of spaced combinations of electrical contacts carried by said second member, each combination being positionally related to a line of spaced data on said rotatable member and being adapted to sequentially engage said sensing fingers, selector means adapted to selectively connect a combination of sensing fingers into said circuit in matching relation with the combination of contacts positionally related to said desired line of data to thereby close said circuit and energize said light source when said related combination of contacts is engaged by said selected combination of sensing fingers, and means associated with said sensing fingers as a group to adjust the line of wiping contact of said fingers with said second member to thereby enable the positional adjustment of a stroboscopically disclosed line of data at said viewing locus.*

*18. In a device of the class described, a cylindrical drum-like member having a data portion at one end and a sensing pattern portion at the other end, said data portion of the member carrying a plurality of spaced rows of data arranged peripherally of said portion in parallel relation to the longitudinal axis of said member, said sensing pattern portion being provided with a plurality of spaced rows of electrical contacts arranged peripherally of said portion in parallel relation to the longitudinal axis of said member, with each row having at least two laterally spaced contacts interconnected by an electrical conductor, said laterally spaced contacts in each row being positionally related on said member to a specific row of data on said data portion thereof and comprising code locator means for said specific row of data, data row carrier means for the data portion of said member to enable the removal of any given row of data for replacement by another row, and means associated with the sensing pattern portion of said*

*member for enabling the variable positioning of electrical contacts in each of the spaced rows of contacts to adapt a contact row as code locator means for its positionally located data row when a data replacement is made in said row.*

*19. In an information locating system; the combination of: a moving member having, an information portion adapted to store changeable pieces of information at different positions on said portion, and a locator portion for storing locator indexes, each index corresponding to a respective one of said positions; means for storing selected pieces of information at one or more of said positions; first sensing means for sensing said locator indexes; means for selecting a given index; a series of regularly spaced indicia on said member; second sensing means for sequentially sensing said indicia; means correlating the locator portion, the selecting means and the first and second sensing means, and operable under control of said second sensing means for testing for a coincidence between the*

*indexes sensed by the first sensing means and the selected index; an information reading locus; and means coupled with said correlating means and operable in response to the detection of said coincidence by the correlating means for producing at said reading locus a manifestation of the information stored at the position corresponding to said selected index.*

References Cited in the file of this patent or the original patent

UNITED STATES PATENTS

| | | |
|---|---|---|
| 660,469 | Silkman | Oct. 23, 1900 |
| 1,574,648 | Hall | Feb. 23, 1926 |
| 1,933,650 | Bascom | Nov. 7, 1933 |
| 2,124,906 | Bryce | July 26, 1938 |
| 2,281,373 | Naes | Apr. 28, 1942 |
| 2,295,000 | Morse | Sept. 8, 1942 |
| 2,397,604 | Hartlev et al. | Apr. 2, 1946 |
| 2,482,886 | Van Gieson | Sept. 27, 1949 |